(12) United States Patent
Yoo et al.

(10) Patent No.: US 10,892,528 B2
(45) Date of Patent: Jan. 12, 2021

(54) BATTERY MODULE, BATTERY PACK COMPRISING BATTERY MODULE, AND VEHICLE COMPRISING BATTERY PACK

(71) Applicant: LG CHEM, LTD., Seoul (KR)

(72) Inventors: Ha-Neul Yoo, Daejeon (KR); Sang-Il Son, Daejeon (KR); Hun Cha, Daejeon (KR); Yun-Ki Choi, Daejeon (KR); Jong-Soo Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 197 days.

(21) Appl. No.: 15/765,770

(22) PCT Filed: Sep. 1, 2016

(86) PCT No.: PCT/KR2016/009792
§ 371 (c)(1),
(2) Date: Apr. 4, 2018

(87) PCT Pub. No.: WO2017/104938
PCT Pub. Date: Jun. 22, 2017

(65) Prior Publication Data
US 2018/0287226 A1 Oct. 4, 2018

(30) Foreign Application Priority Data
Dec. 14, 2015 (KR) .................. 10-2015-0178159

(51) Int. Cl.
*H01M 10/50* (2006.01)
*H01M 10/613* (2014.01)
(Continued)

(52) U.S. Cl.
CPC .......... *H01M 10/613* (2015.04); *H01M 2/10* (2013.01); *H01M 2/1083* (2013.01);
(Continued)

(58) Field of Classification Search
CPC .......... H01M 10/613; H01M 10/625; H01M 10/6554; H01M 10/6556; H01M 2/10; H01M 2/1083
See application file for complete search history.

(56) References Cited

U.S. PATENT DOCUMENTS 9,203,064 B2 12/2015 Lee et al.
2010/0147488 A1 6/2010 Pierre et al.
(Continued)

FOREIGN PATENT DOCUMENTS

CN 104218272 A 12/2014
CN 104604018 A 5/2015
(Continued)

OTHER PUBLICATIONS

English translation of the Written Opinion of the International Searching Authority (form PCT/ISA/237), dated Dec. 8, 2016, for International Application No. PCT/KR2016/009792.
(Continued)

*Primary Examiner* — Raymond Alejandro
(74) *Attorney, Agent, or Firm* — Birch, Stewart, Kolasch & Birch, LLP

(57) ABSTRACT

Disclosed is a battery module, which includes a battery cell assembly including a plurality of battery cells stacked on each other along a vertical direction, a heatsink configured to cover one side of the battery cell assembly, and a pair of cooling plates connected to the heatsink to cover both side surfaces of the battery cell assembly, respectively, the pair of cooling plates having a coolant channel formed along a stacking direction of the plurality of battery cells.

14 Claims, 5 Drawing Sheets

(51) Int. Cl.
*H01M 10/625* (2014.01)
*H01M 10/6556* (2014.01)
*H01M 10/6554* (2014.01)
*H01M 2/10* (2006.01)

(52) U.S. Cl.
CPC ..... *H01M 10/625* (2015.04); *H01M 10/6554* (2015.04); *H01M 10/6556* (2015.04)

(56) References Cited

U.S. PATENT DOCUMENTS

| | | |
|---|---|---|
| 2011/0293986 A1 | 12/2011 | Kozu |
| 2012/0009455 A1 | 1/2012 | Yoon |
| 2012/0009457 A1 | 1/2012 | Lee et al. |
| 2012/0234613 A1 | 9/2012 | Miyatake |
| 2012/0263988 A1 | 10/2012 | Obasih et al. |
| 2013/0065103 A1 | 3/2013 | Yumura |
| 2014/0023894 A1 | 1/2014 | Jansen et al. |
| 2014/0165597 A1 | 6/2014 | Hernon et al. |
| 2014/0234691 A1 | 8/2014 | Lee et al. |
| 2014/0287291 A1* | 9/2014 | Miyawaki ........... H01M 2/1077 429/120 |
| 2015/0064540 A1 | 3/2015 | Roh et al. |
| 2015/0188203 A1 | 7/2015 | Enomoto et al. |
| 2015/0194714 A1 | 7/2015 | You et al. |
| 2015/0263397 A1 | 9/2015 | Janarthanam et al. |

FOREIGN PATENT DOCUMENTS

| | | | |
|---|---|---|---|
| CN | 104716397 A | 6/2015 | |
| CN | 104916878 A | 9/2015 | |
| JP | 11-1126 A | 1/1999 | |
| JP | 2014-78470 A | 1/1999 | |
| JP | 2003-297303 A | 10/2003 | |
| JP | 2004-47262 A | 2/2004 | |
| JP | 2009-140714 A | 6/2009 | |
| JP | 2009-252553 A | 10/2009 | |
| JP | 2010-33882 A | 2/2010 | |
| JP | 2010-157502 A | 7/2010 | |
| JP | WO2011/064955 A1 | 6/2011 | |
| JP | WO2011/148641 A1 | 12/2011 | |
| JP | 2012-18915 A | 1/2012 | |
| JP | 2012-28022 A | 2/2012 | |
| JP | 2012-174408 A | 9/2012 | |
| JP | 2013-38439 A | 2/2013 | |
| JP | 2013-222603 A | 10/2013 | |
| JP | 2013-225432 A | 10/2013 | |
| JP | 2013-229266 A | 11/2013 | |
| JP | 2014-56690 A | 3/2014 | |
| JP | 2014-60088 A | 4/2014 | |
| JP | 2015-528189 A | 9/2015 | |
| KR | 10-2010-0109872 A | 10/2010 | |
| KR | 10-2013-0086485 A | 8/2013 | |
| KR | 10-2013-0086678 A | 8/2013 | |
| KR | 10-2013-0137299 A | 12/2013 | |
| KR | 10-2014-0034362 A | 3/2014 | |
| KR | 10-2014-0037452 A | 3/2014 | |
| KR | 10-2014-0039350 A | 4/2014 | |
| KR | 10-1501026 B1 | 3/2015 | |
| KR | 10-2016-0041411 A | 4/2016 | |
| WO | WO 2013/025608 A1 | 2/2013 | |
| WO | WO 2016/131141 A1 | 8/2016 | |

OTHER PUBLICATIONS

International Search Report for PCT/KR2016/009792 dated Dec. 8, 2016.

* cited by examiner

BATTERY MODULE, BATTERY PACK COMPRISING BATTERY MODULE, AND VEHICLE COMPRISING BATTERY PACK

TECHNICAL FIELD

The present disclosure relates to a battery module, a battery pack including the battery module, and a vehicle including the battery pack.

The present application claims priority to Korean Patent Application No. 10-2015-0178159 filed on Dec. 14, 2015 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A battery pack having a plurality of battery modules is manufactured so that the plurality of secondary batteries are densely packed in a narrow space, and thus it is important to easily dissipate the heat generated from each secondary battery. The secondary battery is charged or discharged by the electrochemical reaction as described above. Therefore, if the heat of the battery module generated during the charging and discharging process is not effectively removed, heat accumulation occurs, which may promote the deterioration of the battery module and in some cases causes ignition or explosion.

Therefore, a high-output large-capacity battery module and a battery pack including the same necessarily require a cooling device for cooling battery cells contained therein.

Generally, cooling devices are classified into two types, namely an air cooling type and a water cooling type, and the air cooling type is more widely used than the water cooling type due to leakage current or waterproofing of the secondary battery.

Since the power produced by a single battery cell is not so large, a commercially available battery module generally has a battery cell assembly in which a plurality of the battery cells are stacked as many as necessary. Here, in the battery cell assembly, a plurality of battery cells are stacked and packaged in a horizontal direction, namely in a vertical direction, in order to realize a higher energy density and a slimmer battery module design.

In addition, in order to cool the heat generated during the production of electricity at each battery cell, a heatsink is generally provided at one side of the battery cell assembly, generally at an upper or lower side of the battery cell assembly, to cool the plurality of battery cells.

However, in the conventional battery module, when the battery module is cooled, temperature variation occurs between a battery cell adjacent to the heatsink and a battery cell not adjacent to the heatsink, for example a battery cell provided at an upper side of the battery cell assembly and a battery cell provided at a lower side of the battery cell assembly when the heatsink is provided at the upper side of the battery cell assembly.

In the conventional battery module, the temperatures of the plurality of battery cells are not balanced due to the cooling variation of the battery cells, which may shorten the life span of the battery module.

Accordingly, it is required to find a way to reduce the cooling variation of the battery cells when the battery module is cooled.

DISCLOSURE

Technical Problem

The present disclosure is directed to providing a battery module which may reduce the cooling variation of battery cells when the battery module is cooled, a battery pack including the battery module, and a vehicle including the battery pack.

Technical Solution

In one aspect of the present disclosure, there is provided a battery module, comprising: a battery cell assembly including a plurality of battery cells stacked on each other along a vertical direction; a heatsink configured to cover one side of the battery cell assembly; and a pair of cooling plates connected to the heatsink to cover both side surfaces of the battery cell assembly, respectively, the pair of cooling plates having a coolant channel formed along a stacking direction of the plurality of battery cells.

The battery cell assembly may include: the plurality of battery cells; and a pair of cell cartridges configured to cover both side surfaces of the plurality of battery cells, wherein each of the pair of cooling plates covers each cell cartridge and is fixed to each cell cartridge by means of a cartridge adhering member.

The pair of cooling plates and the pair of cell cartridges may be made of metal material, and the cartridge adhering member may be a thermal adhesive made of thermally conductive material.

Each of both side surfaces of the plurality of battery cells may be fixed to each cell cartridge by means of the cell adhering member.

The cell adhering member may be a thermal adhesive made of thermally conductive material.

One end of each of the pair of cooling plates may be connected to the heatsink and fixed to the heatsink by means of a heatsink adhering member.

The heatsink adhering member may be a thermal adhesive made of thermally conductive material.

Each of the pair of cooling plates may include: a heat pipe fixed to each cell cartridge and having the coolant channel; and a support panel bent from one end of the heat pipe and fixed to the heatsink.

The heatsink may be provided at an upper side of the battery cell assembly, and the coolant channel may be provided at a lower side of the heatsink and allow a coolant capable of phase-changing into gas or liquid to flow therein.

In another aspect of the present disclosure, there is also provided a battery module, comprising: a battery cell assembly including a plurality of battery cells; and a pair, of cooling plates configured to cover both side surfaces of the battery cell assembly, respectively, the pair of cooling plates having a coolant channel for cooling battery cell assembly, wherein each of both side surfaces of the battery cell assembly is fixed to each cooling plate by means of a thermal adhesive made of thermally conductive material.

A coolant capable of phase-changing into gas or liquid may flow in the coolant channel.

The battery module may further include a heatsink configured to cover one side of the battery cell assembly and connected to the pair of cooling plates.

One end of each of the pair of cooling plates may be connected to the heatsink and fixed to the heatsink by means of a thermal adhesive made of thermally conductive material.

Moreover, the present disclosure provides a battery pack, comprising: at least one battery module according to the above embodiments; and a pack case configured to package the at least one battery module.

In addition, the present disclosure provides a vehicle, comprising at least one battery pack according to the above embodiment.

Advantageous Effects

According to various embodiments as above, it is possible to provide a battery module which may reduce the cooling variation of battery cells when the battery module is cooled, a battery pack including the battery module, and a vehicle including the battery pack.

Accordingly, it is possible to provide a battery module which may have an increased life span by maintaining the temperature balance of the battery cells, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
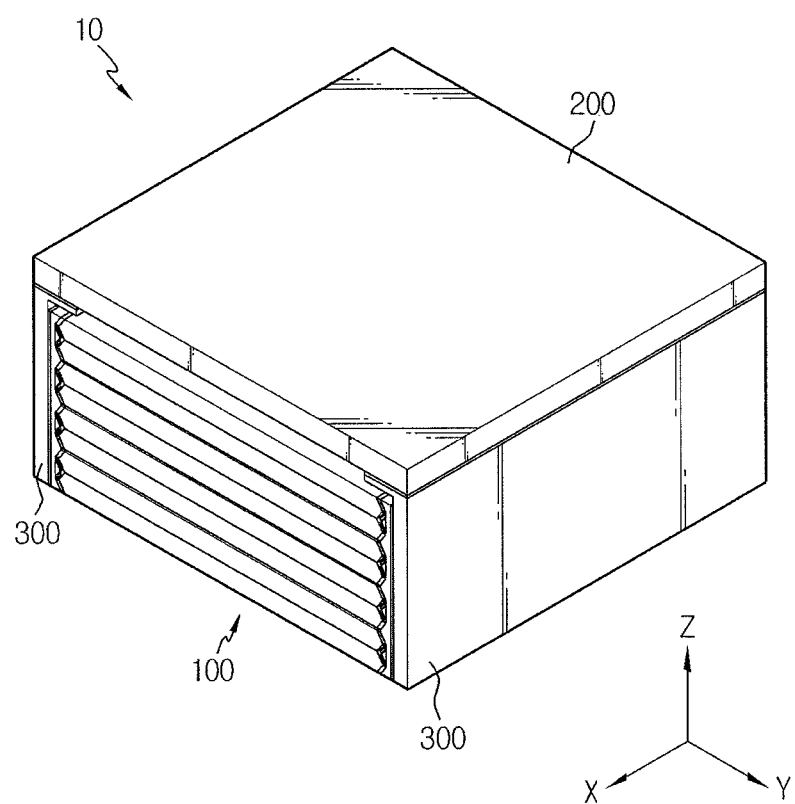
FIG. 1 is a perspective view showing a battery module according to an embodiment of the present disclosure.
Figure 2:
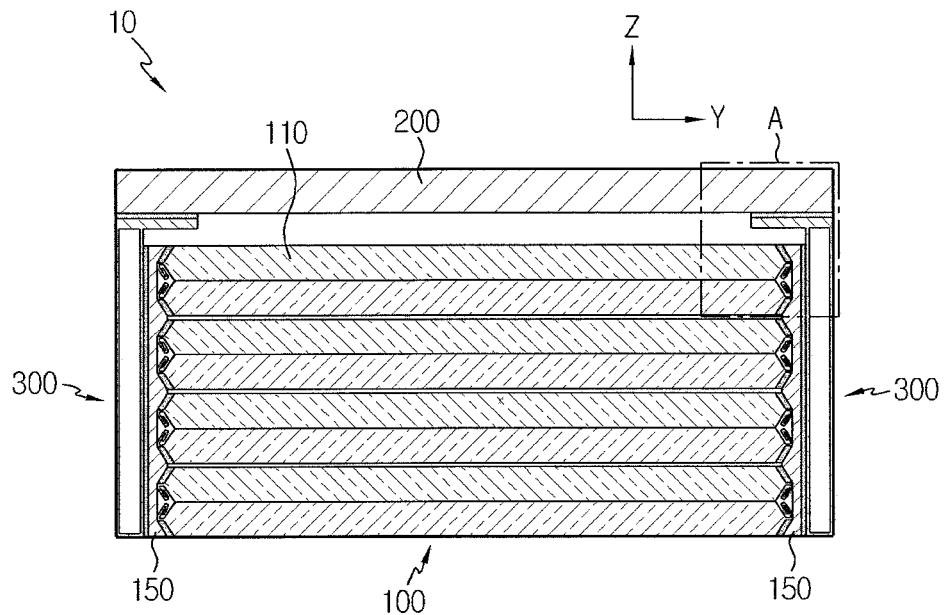
FIG. 2 is a cross-sectioned view showing the battery module of FIG. 1.
Figure 3:
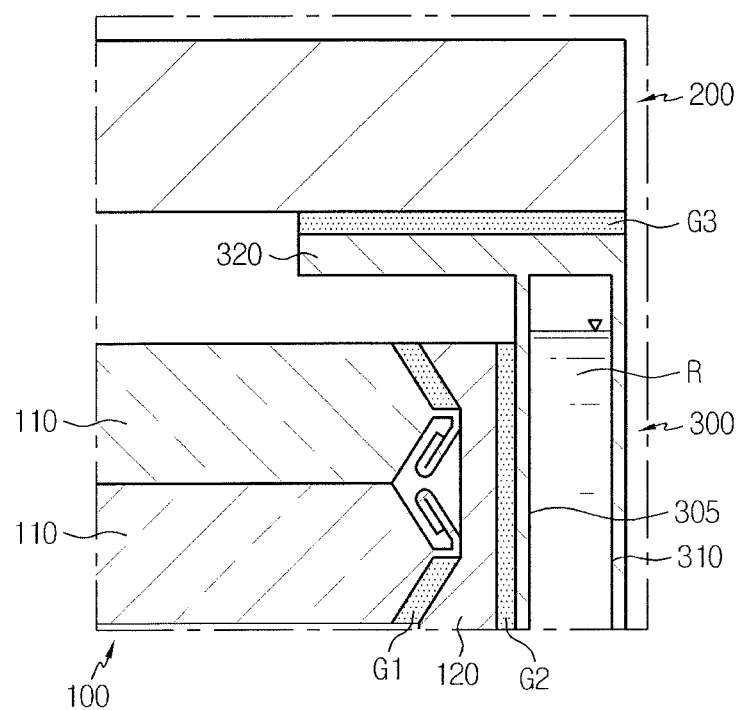
FIG. 3 is an enlarged view showing an A portion of the battery module of FIG. 2.
Figure 4:
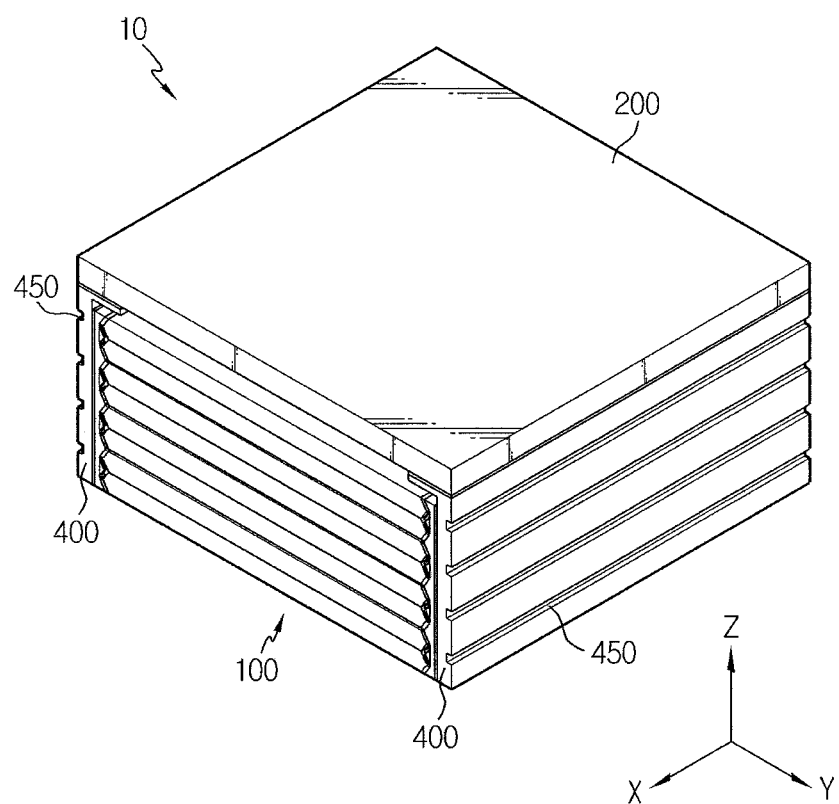
FIG. 4 is a diagram for illustrating a cooling plate according to another embodiment of the battery module of FIG. 1.

FIG. 1 is a perspective view showing a battery module according to an embodiment of the present disclosure, FIG. 2 is a cross-sectioned view showing the battery module of FIG. 1, FIG. 3 is an enlarged view showing an A portion of the battery module of FIG. 2, and FIG. 4 is a diagram for illustrating a cooling plate according to another embodiment of the battery module of FIG. 1.

Referring to FIGS. 1 to 4, a battery module 10 may include a battery cell assembly 100, a heatsink 200 and a pair of cooling plates 300.

The battery cell assembly 100 is used for packaging various components of the battery module 10 and may include a battery cell 110 and a cell cartridge 120.

The battery cell 110 may be a pouch-type secondary battery. The battery cell 110 may be provided in plural, and the plurality of battery cells 110 may be stacked on each other along a vertical direction (Z-axis direction).

The cell cartridge 120 is used for supporting the plurality of battery cells 110 and may be provided in a pair. The pair of cell cartridges 120 may respectively cover both side surfaces of the plurality of battery cells 110.

The pair of cell cartridges 120 may be made of metal material with high thermal conductivity. For example, the pair of cell cartridges 120 may be made of aluminum with high thermal conductivity.

The pair of cell cartridges 120 may be fixed to both side surfaces of the plurality of battery cells 110 by means of a cell adhering member G1. In detail, both side surfaces of the plurality of battery cells 110 may be respectively fixed to the facing cell cartridges 120, by means of the cell adhering member G1. By means of the cell adhering member G1, the pair of cell cartridges 120 may support the plurality of battery cells 110 more stably.

The cell adhering member G1 may be made of thermally conductive material with high thermal conductivity. For example, the cell adhering member G1 may be made of thermal adhesive or thermal interface material.

By means of the cell adhering member G1, the heat generated at the plurality of battery cells 110 may be transferred to the pair of cell cartridges 120 more effectively.

The heatsink 200 is used for cooling the battery cell assembly 100 and may cover one side of the battery cell assembly 100, in detail an upper side of the battery cell assembly 100.

The heatsink 200 may be made of material with high thermal conductivity in order to absorb the heat transferred from the battery cell assembly 100 and also dissipate the heat to the outside. For example, the heatsink 200 may be made of metal material with high thermal conductivity.

The pair of cooling plates 300 is used for supporting the battery cell assembly 100 and transferring the heat transferred from the battery cell assembly 100 to the heatsink 200, and may be connected to the heatsink 200 and cover both side surfaces of the battery cell assembly 100, respectively.

Each of the pair of cooling plates 300 may cover each cell cartridge 120 and be fixed to each cell cartridge 120 by means of a cartridge adhering member G2.

By means of the cartridge adhering member G2, the pair of cooling plates 300 may support the battery cell assembly 100 more stably.

Here, the cartridge adhering member G2 may be made of thermally conductive material with high thermal conductivity, similar to the cell adhering member G1. For example, the cartridge adhering member G2 may be made of thermal adhesive or thermal interface material.

By means of the cartridge adhering member G2, the heat transferred to the pair of cell cartridges 120 may be transferred to the pair of cooling plates 300 more effectively.

The pair of cooling plates 300 may be made of metal material with high thermal conductivity for more effective heat transfer. For example, the pair of cooling plate 300 may be made of aluminum with high thermal conductivity. Accordingly, the heat transferred to the pair of cell cartridges 120 may be transferred to the pair of cooling plates 300 more effectively.

In addition, one of the pair of cooling plates 300, in detail an upper end of the pair of cooling plates 300, is connected to the heatsink 200 and may be fixed to the heatsink 200 by means of a heatsink adhering member G3. By means of the heatsink adhering member G3, the pair of cooling plates 300 may support the heatsink 200 more stably.

Here, the heatsink adhering member G3 may be made of thermally conductive material with high thermal conductivity, similar to the cell adhering member G1 and the cartridge adhering member G2. For example, the heatsink adhering member G3 may be made of thermal adhesive or thermal interface material.

By means of the heatsink adhering member G3, the heat transferred to the pair of cooling plates 300 may be transferred to the heatsink 200 more effectively.

In addition, the pair of cooling plates 300 may respectively have a coolant channel 305 formed below the heatsink 200 along a stacking direction (Z-axis direction) of the plurality of battery cells 110 to enhance the cooling efficiency of the plurality of battery cells 110.

The coolant channel 305 may have a coolant R capable of flowing along the stacking direction (Z-axis direction) and phase-changing into gas or liquid in the coolant channel 305.

The pair of cooling plates 300 may respectively include a heat pipe 310 and a support panel 320.

The heat pipe 310 has the coolant channel 305 and may be fixed to each cell cartridge 120 and each heatsink 200. In addition, each heat pipe 310 may be fixed to each facing cell cartridge 120 by means of the cartridge adhering member G2 and be fixed to each facing heatsink 200 by means of the heatsink adhering member G3.

The support panel 320 may be bent along a horizontal direction (Y-axis direction) from one end of the heat pipe 310 and fixed to the heatsink 200. In detail, the support panel 320 may be fixed to the facing heatsink 200 by means of the heatsink adhering member G3.

By means of the support panel 320, the pair of cooling plate 300 may support the heatsink 200 more stably and ensure a heat dissipation area as much as the area of the support panel 320 to enhance the cooling efficiency.

Meanwhile, as shown in FIG. 4, the pair of cooling plates 400 may further include a heat dissipation groove 450. The heat dissipation groove 450 may be provided at an outer surface of each cooling plate 400, and a plurality of heat dissipation grooves may be provided at regular intervals.

By means of the plurality of heat dissipation grooves 450, the pair of cooling plates 400 may ensure a large surface area, and thus the cooling efficiency of the pair of cooling plates 400 may be further enhanced.

Hereinafter, the cooling process of the battery module 10 configured as above according to this embodiment will be described in more detail.

Figure 5:
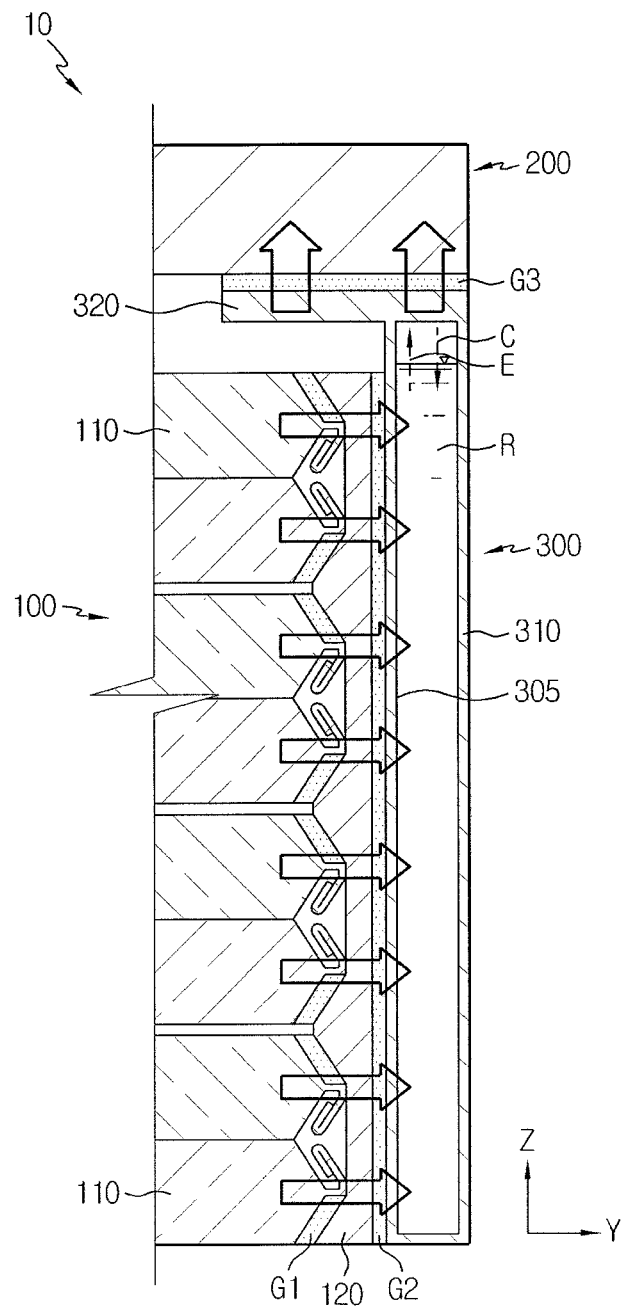
FIG. 5 is a diagram for illustrating a process of cooling the battery module of FIG. 1.

FIG. 5 is a diagram for illustrating a process of cooling the battery module of FIG. 1.

Referring to FIG. 5, when the battery module 10 is cooled, the heat generated at the plurality of battery cells 110 of the battery cell assembly 100 may be transferred to the heatsink 200 via the cell adhering member G1, the pair of cell cartridges 120, the cartridge adhering member G2, the pair of cooling plates 300 and the heatsink adhering member G3.

Here, since the cell adhering member G1, the pair of cell cartridges 120, the cartridge adhering member G2, the pair of cooling plates 300 and the heatsink adhering member G3 are made of material with high thermal conductivity, the heat of the plurality of battery cells 110 may be sent to the heatsink 200 effectively.

Moreover, since the pair of cooling plates 300 are provided along the stacking direction (Z-axis direction) of the plurality of battery cells 110, the heat respectively generated from the battery cell 110 provided at an upper side of the battery cell assembly 100 and generated from the battery cell 110 provided at a lower side of the battery cell assembly 100 may be effectively absorbed and transferred to the heatsink 200.

In addition, since the plurality of battery cells 110 may also be cooled by means of the coolant R provided at the coolant channel 305 of the pair of cooling plate 300, when the battery module 10 is cooled, the cooling efficiency may be further enhanced.

Moreover, since the coolant R provided at the coolant channel 305 is capable of phase-changing into gas or liquid in the coolant channel 305, the latent heat of the coolant may assist in cooling the plurality of battery cells 110.

Seeing the phase change of the coolant R, when the pair of cooling plates 300 and the heatsink 200 are heated, the coolant may be evaporated (E) into gas and moved to an upper side of the coolant channel 305. Since the upper side of the coolant channel 305 is disposed adjacent to the heatsink 200, when the heatsink 200 and the pair of cooling plates 300 are cooled, the evaporated (E) coolant R may be condensed (C) to liquid and moved to the lower side of the coolant channel 305.

The phase change of the coolant R may be repeated according to the change of temperature of the pair of cooling plates 400 and the heatsink 200, and thus, when the battery module 10 is cooled, the coolant R may assist in cooling the battery cells 110 while phase-changing to gas or liquid in the coolant channel 305.

As described above, when the battery module 10 is cooled, the battery module 10 of this embodiment may greatly reduce cooling variation of the plurality of battery cells 110 of the battery cell assembly 100 by means of the pair of cooling plates 300, 400.

Therefore, the battery module 10 of this embodiment may greatly increase a life span of the battery module by maintaining temperature balance of the plurality of battery cells 110 of the battery cell assembly 100.

Figure 6:
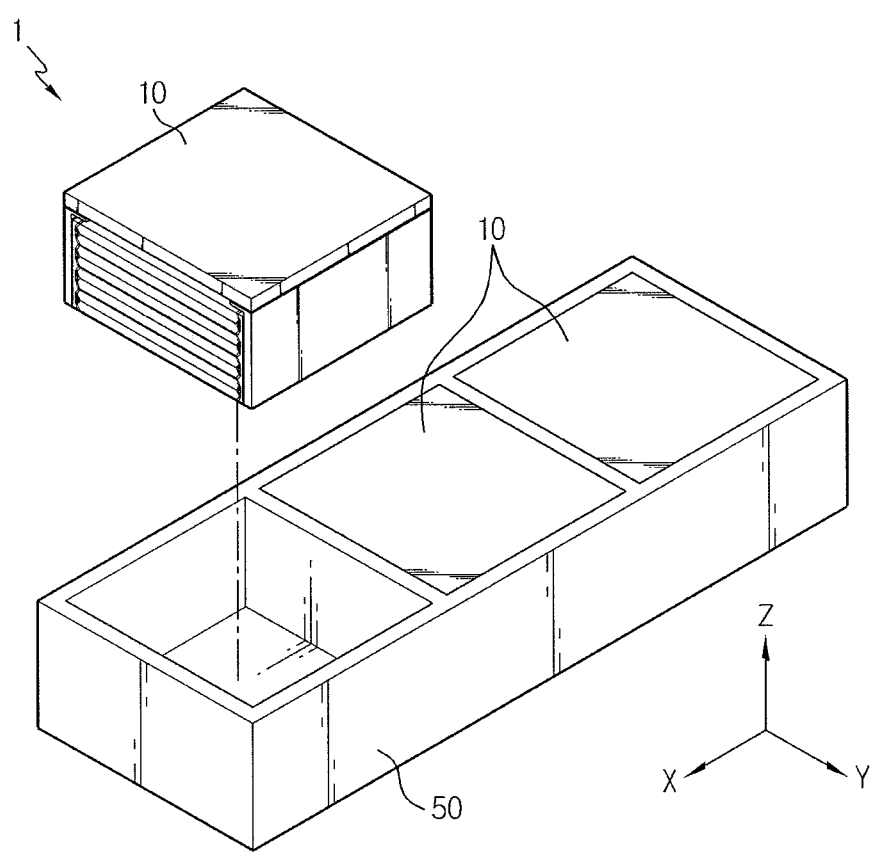
FIG. 6 is a diagram for illustrating a battery pack according to an embodiment of the present disclosure.

FIG. 6 is a diagram for illustrating a battery pack according to an embodiment of the present disclosure.

Referring to FIG. 6, a battery pack may include at least one battery module 10 according to the former embodiment and a pack case 50 for packaging the at least one battery module 10.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a battery cell assembly including a plurality of battery cells stacked on each other along a vertical direction;
a heatsink configured to cover a first side of the battery cell assembly;
a pair of cooling plates connected to the heatsink to cover opposite sides of the battery cell assembly, respectively, such that the first side extends between the opposite sides, and the pair of cooling plates having a coolant channel formed along a stacking direction of the plurality of battery cells; and
a pair of cell cartridges configured to cover the opposite sides of the plurality of battery cells,
wherein each of the pair of cooling plates covers each cell cartridge and is fixed to each cell cartridge by means of a cartridge adhering member.

2. The battery module according to claim 1,
wherein the pair of cooling plates and the pair of cell cartridges are made of metal material, and
wherein the cartridge adhering member is a thermal adhesive made of thermally conductive material.

3. The battery module according to claim 1,
wherein each of the opposite sides of the plurality of battery cells is fixed to each cell cartridge by means of the cell adhering member.

4. The battery module according to claim 3,
wherein the cell adhering member is a thermal adhesive made of thermally conductive material.

5. The battery module according to claim 1,
wherein one end of each of the pair of cooling plates is connected to the heatsink and fixed to the heatsink by means of a heatsink adhering member.

6. The battery module according to claim 5,
wherein the heatsink adhering member is a thermal adhesive made of thermally conductive material.

7. The battery module according to claim 1,
wherein each of the pair of cooling plates includes:
a heat pipe fixed to each cell cartridge and having the coolant channel; and
a support panel bent from one end of the heat pipe and fixed to the heatsink.

8. The battery module according to claim 1,
wherein the first side is an upper side of the battery cell assembly, and
wherein the coolant channel is provided at a lower side of the heatsink and allows a coolant capable of phase-changing into gas or liquid to flow therein.

9. The battery module according to claim 1,
wherein the heatsink is configured to cover an entirety of the first side of the battery cell assembly.

10. A battery pack, comprising:
at least one battery module defined in claim 1; and
a pack case configured to package the at least one battery module.

11. A vehicle, comprising at least one battery pack defined in claim 10.

12. A battery module, comprising:
a battery cell assembly including a plurality of battery cells;
a heatsink configured to cover a first side of the battery cell assembly and connected to the pair of cooling plates;
a pair of cooling plates configured to cover opposite sides of the battery cell assembly, respectively, such that the first side extends between the opposite sides, and the pair of cooling plates having a coolant channel for cooling the battery cell assembly,
wherein each of the opposite sides of the battery cell assembly is fixed to each cooling plate by means of a thermal adhesive made of thermally conductive material, and
wherein one end of each of the pair of cooling plates is connected to the heatsink and fixed to the heatsink by means of a thermal adhesive made of thermally conductive material.

13. The battery module according to claim 12,
wherein a coolant capable of phase-changing into gas or liquid flows in the coolant channel.

14. The battery module according to claim 12,
wherein the heatsink is configured to cover an entirety of the first side of the battery cell assembly.

* * * * *